(No Model.)
W. D. KING.
FAUCET.
No. 525,500.  Patented Sept. 4, 1894.
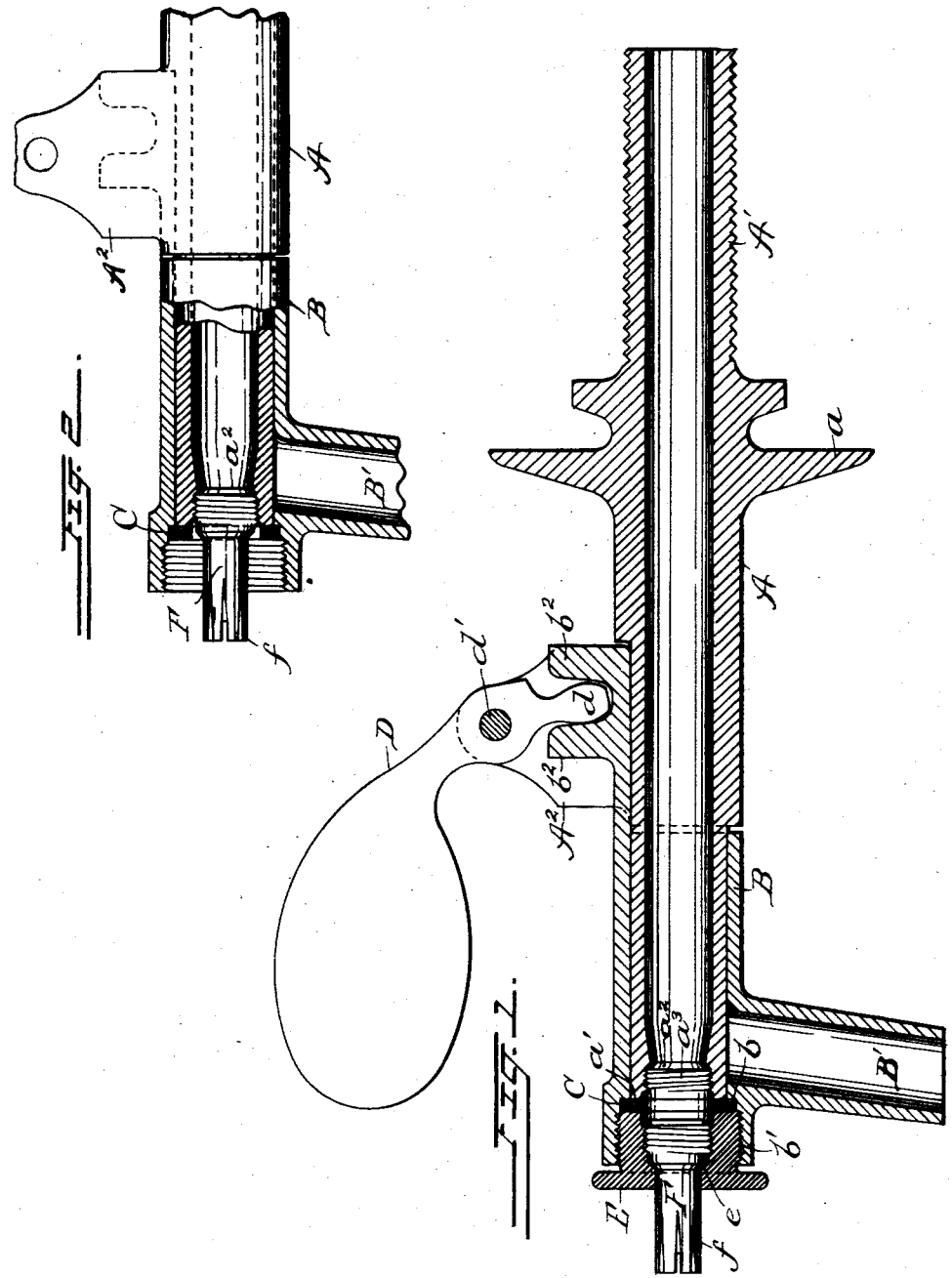
Witnesses  
Ed. A. Kelly  
David Levan
William D. King, Inventor
By Attorney

UNITED STATES PATENT OFFICE.

WILLIAM D. KING, OF READING, PENNSYLVANIA, ASSIGNOR OF ONE-HALF TO LINGLE D. DOUGLAS, OF SAME PLACE.

FAUCET.

SPECIFICATION forming part of Letters Patent No. 525,500, dated September 4, 1894.

Application filed April 10, 1894. Serial No. 507,056. (No model.)

*To all whom it may concern:*

Be it known that I, WILLIAM D. KING, a citizen of the United States, residing at Reading, county of Berks, State of Pennsylvania, have invented certain Improvements in Faucets, of which the following is a specification.

My invention relates to stop cocks or faucets and especially to that class in which a fixed stem and a sliding valve are employed.

The main object of my improvement is to enable the washer or valve to be easily and quickly renewed when necessary. In some cases a special neck has been provided for this purpose in the fixed stem so that the liquid may be shut off from the main portion of the faucet while the required change is made, but this involves considerable complication and expense besides giving a more or less clumsy appearance to the faucet.

By my improvement I accomplish the same purpose in a very simple, effective and inexpensive manner and at the same time provide a handsome and easily operated faucet.

Figure 1 is a longitudinal section of my improved faucet, showing the plug in its normal position, the valve being closed. Fig. 2 is a similar view of a portion of the faucet, showing the plug seated in the end of the fixed stem and the screw cap removed from the sleeve.

A is the tubular stem of the faucet which is represented as provided with the usual screw threaded shank A' and collar $a$ for connecting it to the reservoir from which beer or other liquid is to be tapped.

B is the sliding sleeve which is mounted upon the outer end of the stem and carries the valve or washer C, the latter being arranged to seat against the end $a'$ of the stem. This sleeve is formed with a nozzle B' and a rear extension B which fits loosely between jaws $A^2$ on the stem A and is provided with teeth $b^2$ which are engaged by the end $d$ of an operating lever D. This lever is pivoted between the jaws at $d'$ and is weighted at its outer end so as to normally close the valve as shown. The outer end of the sleeve is enlarged so as to form an internal shoulder $b$ and is internally screw threaded at $b'$ to receive a cap E which serves to press the washer C tightly against the shoulder $b$.

The cap E is provided with a central opening which is screw threaded at its inner end to receive an adjustable plug F, the reduced shank $f$ of which projects through the rear of the cap and is grooved so as to be conveniently turned. The screw threaded portion of the plug is adapted to pass through the opening in the washer C and to fit also a screw thread $a^3$ in the end of the stem A.

The normal position of the parts is as indicated in Fig. 1. The plug F is turned back against the seat $e$ in the cap thus preventing any escape through the latter. When the weighted lever D is raised to a vertical position the sleeve B carrying the valve C is moved outward on the stem thus permitting the liquid to flow through the nozzle B'.

When the washer C requires renewal all that is needed to permit free access to the washer is to move the screw plug inward by turning the projecting shank $f$ until it engages the thread $a^3$ in the stem A and is pressed against the seat $a^2$ in the latter as shown in Fig. 2 thus effectually cutting off the flow of liquid independently of the washer valve C. The latter may then be removed by unscrewing the cap E and a new one inserted after which the cap and afterward the plug are returned to their normal positions.

Having thus fully described my invention, I do not desire to limit myself to the exact construction shown; but

What I claim is—

1. In a faucet the combination with a fixed tubular stem, a sleeve nozzle thereon and mechanism for moving the same, of a washer removably secured within the sleeve by means of an open screw cap seating against the fixed stem, and an adjustable plug arranged to close either the cap or the stem, substantially as and for the purpose set forth.

2. In a faucet the combination with a fixed tubular stem having an internal valve seat and screw threaded in the end thereof, and a sliding sleeve having an internal shoulder and screw thread at its outer end, of a washer, a screw cap for pressing the same against said shoulder, and a screw plug adapted to engage said screw thread in the stem and a similar thread in the cap and having its shank extended through the cap, said plug being arranged to pass through the washer and seat either in the stem or the plug, substantially as and for the purpose set forth.

In testimony whereof I affix my signature in presence of two witnesses.

WM. D. KING.

Witnesses:
W. G. STEWART,
F. PIERCE HUMMEL.